US012724999B2

(12) United States Patent
Yang

(10) Patent No.: US 12,724,999 B2
(45) Date of Patent: Sep. 1, 2026

(54) WIRELESS INFORMATION INTEGRATED FLAKE AND SEALING LINER COMPRISING THE SAME

(71) Applicant: Yen-Wu Yang, New Taipei City (TW)

(72) Inventor: Yen-Wu Yang, New Taipei City (TW)

( * ) Notice: Subject to any disclaimer, the term of this patent is extended or adjusted under 35 U.S.C. 154(b) by 0 days.

(21) Appl. No.: 19/026,436

(22) Filed: Jan. 17, 2025

(65) Prior Publication Data

US 2025/0378296 A1 Dec. 11, 2025

(30) Foreign Application Priority Data

Jun. 11, 2024 (TW) ................................ 113121523
Nov. 6, 2024 (TW) ................................ 113142477

(51) Int. Cl.
*G06K 19/06* (2006.01)
*G06K 19/077* (2006.01)

(52) U.S. Cl.
CPC . *G06K 19/07722* (2013.01); *G06K 19/07775* (2013.01); *G06K 19/07777* (2013.01)

(58) Field of Classification Search
CPC ....... G06K 19/07773; G06K 19/07749; G06K 19/0701; G06K 19/07722; G06K 19/0775; G06K 19/07777; G06K 19/07775
USPC ................................................ 235/492, 487
See application file for complete search history.

(56) References Cited

U.S. PATENT DOCUMENTS 7,973,664 B1 7/2011 Lambert
11,926,121 B1 * 3/2024 Yang .................... B32B 15/085
2009/0153334 A1 6/2009 Burns
2012/0217244 A1 8/2012 Phaneuf
2020/0122897 A1 * 4/2020 Yang ..................... B65D 33/20
2021/0016924 A1 * 1/2021 Yang ................. G08B 13/1463

FOREIGN PATENT DOCUMENTS

CN 110271256 A 9/2019
CN 110271256 * 10/2021 ............ B32B 27/00
CN 115285518 * 11/2022 ............ B32B 27/00
CN 115285518 A 11/2022
JP 2006137474 A 6/2006
TW M639188 U 4/2023

* cited by examiner

*Primary Examiner* — Daniel St. Cyr

(57) ABSTRACT

Provided is a wireless information integrated flake, including: a base membrane; an information-heating layer including an information region and an electromagnetic induction heating ring; a first adhesion layer disposed between the base membrane and the information-heating layer, wherein the information region has an antenna and a chip conductively connected to each other, and the electromagnetic induction heating ring surrounds the information region when viewed from a plan-view angle. The wireless information integrated flake can be used to make a sealing liner, enhances the function of wireless information reading, writing and transmission, reduces a waste of materials, reduces power consumption, and greatly enhances the development of automation, digitalization and smartization of plants, warehouses, logistics, retailers, and unmanned POS (point of sale) management.

13 Claims, 6 Drawing Sheets

100'

100'

900

WIRELESS INFORMATION INTEGRATED FLAKE AND SEALING LINER COMPRISING THE SAME

CROSS-REFERENCE TO RELATED APPLICATION

This non-provisional application claims priority under 35 U.S.C. § 119(a) on Patent Application No(s).113121523 filed in Taiwan, R.O.C. on Jun. 11, 2024, and on Patent Application No(s).113142477 filed in Taiwan, R.O.C. on Nov. 6, 2024, the entire contents of which are hereby incorporated by reference.

BACKGROUND OF THE INVENTION

1. Field of the Invention

The present disclosure relates to wireless information integrated flakes, and in particular to a wireless information integrated flake for use in an electromagnetic induction sealing liner and a sealing liner comprising the wireless information integrated flake.

2. Description of the Related Art

A conventional way of allowing a product to be traceable involves attaching an information tag (typically an RF tag) capable of writing and reading information to the package of the product, with the information tag storing therein data about the product, such as product model number, production history, inventory, and data about logistics and transport. For instance, the prior art teaches hanging the information tag on the neck of a product container directly or adhering the information tag to the middle part of a product container directly.

In general, the RFID tag comprises an antenna for receiving/transmitting signals and a chip for processing RF signals. The RFID tag is disposed on the outer surface of a container and read by a reader to manage and monitor the product's production history, inventory and logistics/transport status.

Conventional electromagnetic induction sealing liners each have an aluminum foil layer and a lower layer. The aluminum foil layer can be heated up through electromagnetic induction to melt the lower layer in contact with the mouth of a container, allowing the lower layer to adhere to and thereby seal the mouth of the container.

To prevent tampering, some electromagnetic induction sealing liners have therein an information layer each. The information layer carries an RF chip and an RF antenna. The RF chip stores various product-related information, such as production information and transport information, to facilitate tampering prevention and tracing.

BRIEF SUMMARY OF THE INVENTION

However, the prior art teaches hanging the information tag on the neck of a product container directly or adhering the information tag to the middle part of a product container directly; as a result, dishonest users can easily remove or peel off the information tag and reuse it. Some dishonest users even remove or peel off the information tag and then hang it on or adhere it to the container of another product to reuse it. In consequence, the information tag is vulnerable to tampering. In addition, loss is incurred by buyers or sellers when the reuse of the information tag results in a higher purchasing price or a lower selling price. Last but not least, the distance that wireless signals can propagate is greatly shortened, because the wireless signals are absorbed by the contents of a liquid in the container when the information tag is too close to the contents of the liquid.

When an information tag (RFID tag) is integrated into a sealing liner, peeling off the sealing liner results in peeling off or destroying the information tag to preclude the tampering of the information tag. Conventional sealing liners each comprise an aluminum foil layer. Thus, during a heating process performed through electromagnetic induction, heat is not only found at the seal region of the container but also spread to the other regions (for example, an aluminum foil layer) of the electromagnetic induction sealing liner, causing a waste of energy. Furthermore, owing to the heat, unpleasant odor permeates the contents of the container whenever the adhesive sealing layer is heated up. Moreover, the overuse of the aluminum foil is detriment to environments.

Conventional electromagnetic induction sealing liners each comprising an information layer have drawbacks as follows: (1) with the information layer being self-contained, not only is the required thickness of the electromagnetic induction sealing liner inevitably excessive, but the electromagnetic induction sealing liner is also confronted with a waste of materials, a waste of energy, and a waste of manpower; and (2) the aluminum foil layer is integrally formed and thus interferes with the information layer and even greatly attenuates wireless information transmission performance.

Therefore, it is imperative to solve the problems facing the application of information tags to sealing liners and effectively reduce the amounts of the aluminum foils used in sealing liners.

The advantages of the disclosure are described below. A wireless information integrated flake comprising an information region (RFID tag) is adapted for use in making a sealing liner to effectively reduce the required amount of the aluminum foils used and reduce power consumption. Specifically speaking, the wireless information integrated flake of the disclosure enhances the function of wireless information transmission, reduces a waste of materials, reduces power consumption, precludes a waste of manpower, precludes metal/liquid interference, enhances production effectiveness, manifests high communication performance, greatly increases communication distances, greatly enhances the development of automation, digitalization and smartization of plants, warehouses, logistics, retailers, and unmanned POS (point of sale) management. In a specific embodiment, the wireless information integrated flake of the disclosure turns on a battery to supply power according to a predetermined rule, keeps a record of temperature and position parameters regularly, and effectively controls cold-chain logistics. The wireless information integrated flake of the disclosure can be embedded in the sealing liner, rendering it easy and simple to produce various sealing liners, especially electromagnetic induction sealing liners.

Therefore, it is an objective of an aspect of the disclosure to provide a wireless information integrated flake, comprising: a base membrane; an information- heating layer comprising an information region and an electromagnetic induction heating ring; and a first adhesion layer disposed between the base membrane and the information-heating layer, wherein the information region has an antenna and a chip conductively connected to each other, and the electromagnetic induction heating ring surrounds the information region when viewed from a plan-view angle.

In an embodiment, the wireless information integrated flake further has a protective layer and a second adhesion layer, the protective layer being disposed on a side of the information-heating layer and facing away from the base membrane, and the second adhesion layer being disposed between the information-heating layer and the protective layer.

In an embodiment, the electromagnetic induction heating ring separates from the information region by a spacing. In a preferred embodiment, there is full of a spacing between the electromagnetic induction heating ring and the information region.

In an embodiment, the protective layer is made of at least one selected from the group consisting Polyethylene Terephthalate (PET), Polypropylene (PP), Polyethylene (PE), Polyamide (PA), Polyvinylidene Chloride (PVDC), Ethylene Vinyl Alcohol copolymer (EVOH), Polyethylene Naphthalate (PEN) and Polyimide (PI), and being of a thickness of 12 μm~100 μm.

In an embodiment, the base membrane is made of at least one selected from the group consisting of Polyimide (PI), Polyethylene Naphthalate (PEN), Polyethylene Terephthalate (PET), Polycarbonate (PC), Polypropylene (PP) and Polyethylene (PE), and being of a thickness of 20 μm~150 μm.

In an embodiment, a cutting line is defined on an inner side of an inner rim of the electromagnetic induction heating ring, has a plurality of break points, lies between the information region and the electromagnetic induction heating ring, and surrounds the information region.

In an embodiment, the electromagnetic induction heating ring is made of aluminum, copper, gold, silver or tin and is of a thickness of 6 μm~40 μm.

In an embodiment, the first adhesion layer is made of lamination adhesive and is of a thickness of 0.5 μm~7 μm.

In an embodiment, the second adhesion layer is made of lamination adhesive and is of a thickness of 0.5 μm~7 μm.

In an embodiment, the spacing is the distance between the outermost edge of the information region and the innermost edge of the electromagnetic induction heating ring and is equal to 0.1 mm~3 mm.

In an embodiment, the information-heating layer comprising at least one physical connection bridge which connecting the information region and the electromagnetic induction heating ring.

A sealing liner in an aspect of the disclosure comprises the wireless information integrated flake.

In an embodiment, the sealing liner further comprises an upper layer laminated to the wireless information integrated flake from above, the upper layer being made of at least one selected from the group consisting of paper, PE, PP, PET, PA, PEN, Polyimide (PI), Expandable Polyethylene (EPE), Expandable Polypropylene (EPP), Expandable Polystyrene (EPS), wax, varnish, silicone oil and Polyurethane, and being of a thickness of 12 μm~3 mm.

In an embodiment, the sealing liner further comprises a lower layer laminated to the wireless information integrated flake from below, the lower layer being made of at least one selected from the group consisting of paper, PE, PP, PET, Polyamide (PA), Polyvinylidene Chloride (PVDC), Ethylene Vinyl Alcohol copolymer (EVOH), Ethylene Vinyl Acetate copolymer (EVA), Polyisobutylene (PIB), Ethylene Acrylic Acid copolymer (EAA), Ethylene Ethyl Acrylate (EEA), Ethylene-Methyl Methacrylate copolymer (EMMA), Ethylene-Methyl Acrylate copolymer (EMAC), Ethylene Methacrylic Acid copolymer (EMAA), polyacrylate, polyacetate and polyurethane, and being of a thickness of 3 μm~120 μm.

Therefore, it is an objective of an aspect of the disclosure to provide a wireless information integrated flake, especially a wireless information integrated flake capable of heating up a sealing liner through electromagnetic induction. The wireless information integrated flake is applicable to various sealing liners, enhances the function of wireless information transmission, reduces a waste of materials, reduces power consumption, precludes a waste of manpower, precludes metal/liquid interference, enhances production effectiveness, manifests high communication performance, greatly increases communication distances; greatly enhances the development of automation, digitalization and smartization in plants, warehouses, logistics, retailers, store and unmanned POS (point of sale) management.

DETAILED DESCRIPTION OF THE INVENTION

The implementation of the disclosure is hereunder illustrated by specific embodiments. Persons skilled in the art can gain insight into the other advantages and effects of the disclosure accordingly. The disclosure can be implemented or applied in accordance with any other variant embodiments. Details presented herein may be modified or changed from different perspectives and for different applications without departing from the spirit of the disclosure.

Unless otherwise stated, the meaning of the expression "A~B" used herein and used in the appended claims includes "greater than A and less than B." For example, the meaning of the expression "10~40% w/w" includes "greater than 10% w/w and less than 40% w/w."

First Embodiment

<Wireless Information Integrated Flake>

Figure 1:
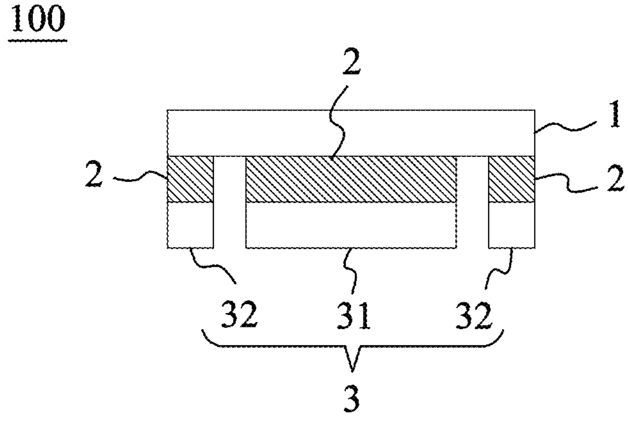
FIG. 1 is a cross-sectional view of a wireless information integrated flake according to an embodiment of the disclosure.

Referring to FIG. 1, there is shown a cross-sectional view of a wireless information integrated flake 100 according to an embodiment of the disclosure. As shown in FIG. 1, the wireless information integrated flake 100 in an embodiment of the disclosure comprises a base membrane 1, a first adhesion layer 2, and an information-heating layer 3. The first adhesion layer 2 is disposed between the base membrane 1 and the information-heating layer 3 to connect the base membrane 1 and the information-heating layer 3.

<<Base Membrane>>

The base membrane 1 is an initial layer for use in making a wireless information integrated flake. In a specific embodiment, the base membrane 1 is made of at least one selected from the group consisting of PI, PEN, PET, PC, PP and PE. The base membrane 1 is preferably of a thickness of 20 μm~150 μm to maximize longitudinal tensile strength. As shown in FIG. 1, the base membrane 1 has a lower surface joined to the first adhesion layer 2 and an upper surface functioning as a printing surface for printing different patterns.

<<First Adhesion Layer>>

The first adhesion layer is adapted to join the base membrane and the information-heating layer together. In a specific embodiment, the sole purpose of the first adhesion layer 2 is to join the base membrane 1 and the information-heating layer 3 together, whereas the first adhesion layer 2 is, for example, made of lamination adhesive. The first adhesion layer 2 is of a thickness of 0.5 μm~7 μm to allow the peel strength between two joined layers to be greater than 4N/15 mm.

<<Information-heating Layer>>

According to the disclosure, the information-heating layer 3 comprises an information region 31 and an electromagnetic induction heating ring 32. The information region 31 is capable of reading, writing and transmitting wireless information to allow a product to be traceable. The information region 31 has an antenna 312 and a chip 311 conductively connected to each other. The electromagnetic induction heating ring 32 generates heat through the electromagnetic induction of the electromagnetic field produced by an electromagnetic induction sealing machine; thus, an adhesive sealing layer of the sealing liner is heated up and melted so as to be sealed to the container mouth of the container, thereby forming an electromagnetic induction sealing liner for sealing the container mouth. The wireless information integrated flake of the disclosure enables heat to be mostly generated by the electromagnetic induction heating ring 32, allowing a small amount of heat to be transferred only by at least one physical connection bridge 33 between the antenna 312 and the electromagnetic induction heating ring 32. The physical connection bridges 33 is 0.1 mm~3 mm in length and 0.01 mm~5 mm in width, and the physical connection bridges 33 can be made of the same material as the antenna 312. Thus, not only is the heat for use in achieving electromagnetic induction sealing stopped from massively propagating toward the central region of the sealing liner, but a waste of energy is also mitigated.

Figure 2A:
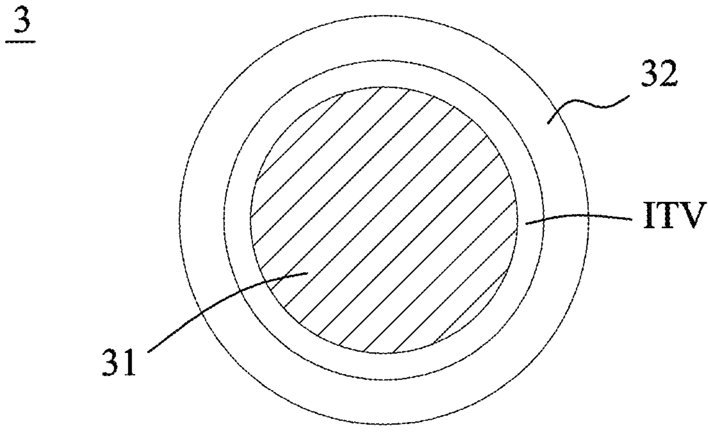
FIG. 2A is a plan view of an information-heating layer according to an embodiment of the disclosure.
Figure 2B:
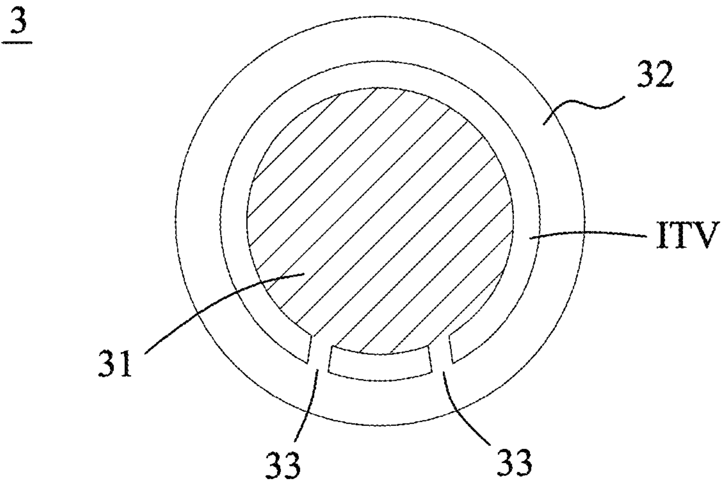
FIG. 2B is a plan view of an information-heating layer according to another embodiment of the disclosure.

FIG. 2A is a plan view of an information-heating layer according to an embodiment of the disclosure, and FIG. 2B is a plan view of an information-heating layer according to another embodiment of the disclosure. As shown in FIG. 2A or 2B, the electromagnetic induction heating ring 32 surrounds the information region 31 when viewed from a plan-view angle. As shown in FIG. 2A, there is full of a spacing ITV between the electromagnetic induction heating ring 32 and the information region 31, that is, there is no physical connection component (such as the physical connection bridge described later) between the electromagnetic induction heating ring 32 and the information region 31. By filling the spacing ITV between the electromagnetic induction heating ring 32 and the information region 31, the filled spacing ITV stops the heat from being transferred to the information region 31 in the course of electromagnetic induction heating, so it is a preferred embodiment. The spacing ITV (defined as the distance between the outermost edge of the information region and the innermost edge of the electromagnetic induction heating ring) is 0.1 mm~3 mm. As shown in FIG. 2B, the electromagnetic induction heating ring 32 and the information region 31 are separated almost entirely by a spacing ITV. The spacing ITV stops most of the heat from being transferred to the information region 31 in the course of electromagnetic induction heating, and the spacing ITV (defined as the distance between the outermost edge of the information region and the innermost edge of the electromagnetic induction heating ring) is 0.1 mm~3 mm. At least one physical connection bridge 33 (with two being shown in FIG. 2B and FIG. 3B) is disposed between the antenna 312 and the electromagnetic induction heating ring 32 and is 0.1 mm~3 mm in length and 0.01 mm~5 mm in width. At this point in time, although the electromagnetic induction heating ring 32 in the shape of a closed-ring structure is electrically connected to the information region 31, the distance of wireless communication won't decrease too much. In other words, between the electromagnetic induction heating ring 32 and the information region 31, there can be full of a spacing ITV, have both spacing ITV and physical connection bridge 33 or not any spacing. For example, between the electromagnetic induction heating ring 32 and the information region 31 can be full of physical connection bridge 33.

In a specific embodiment, the electromagnetic induction heating ring 32 is made of metal, for example, aluminum, copper, gold, silver or tin. The electromagnetic induction heating ring 32 is preferably an aluminum foil and is of a thickness of 6um~40um to generate heat when subjected to a varying electromagnetic field and optimize cost-effectiveness.

The chip 311 has a unique identification code that is selected to fulfill a purpose, for example, a radio-frequency identification near-field communication (RFID_NFC) chip, a radio-frequency identification high-frequency (RFID_HF) chip, a radio-frequency identification ultra-high-frequency (RFID_UHF) chip or a radio-frequency identification microwave (RFID_MW) chip, but the disclosure is not limited thereto. All the aforesaid chips can coordinate with the antenna 312 to perform wireless information communication function.

The antenna 312 generates signals that can be wirelessly transmitted and is made of metal, for example, copper, silver, gold, tin or aluminum, but the disclosure is not limited thereto.

Figure 3A:
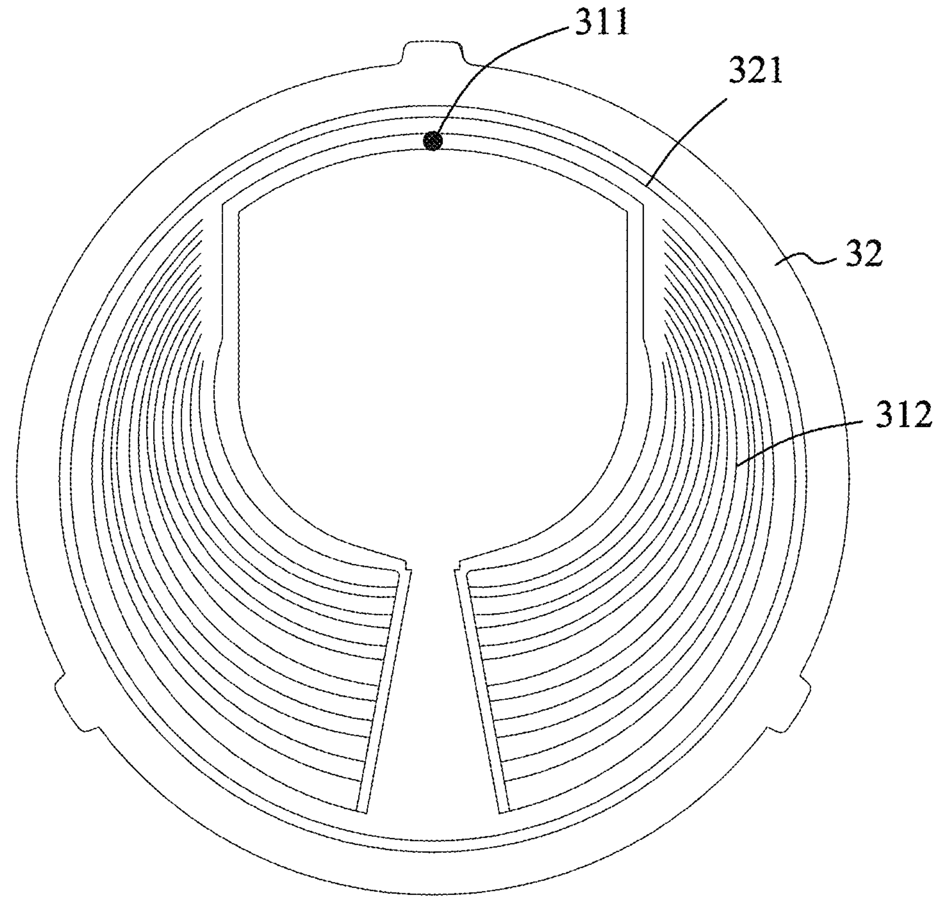
FIG. 3A is a plan view of an information region according to an embodiment of the disclosure.
Figure 3B:
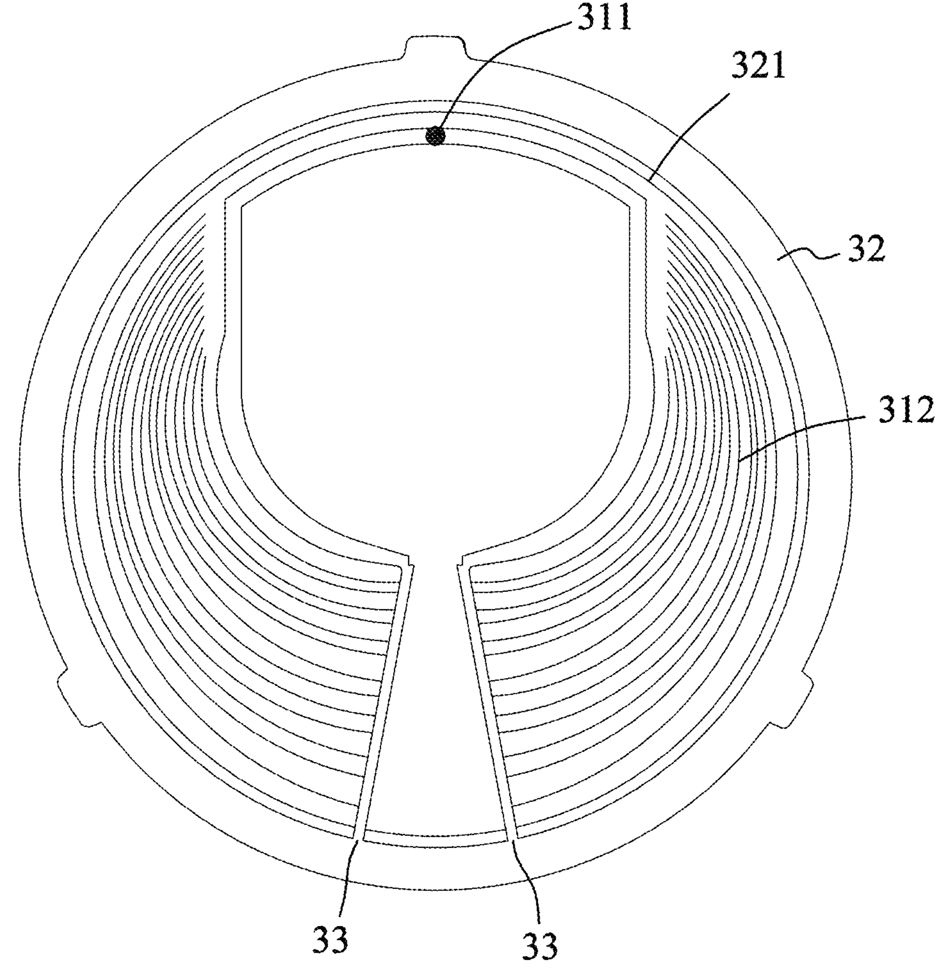
FIG. 3B is a plan view of an information region according to another embodiment of the disclosure.
Figure 6:
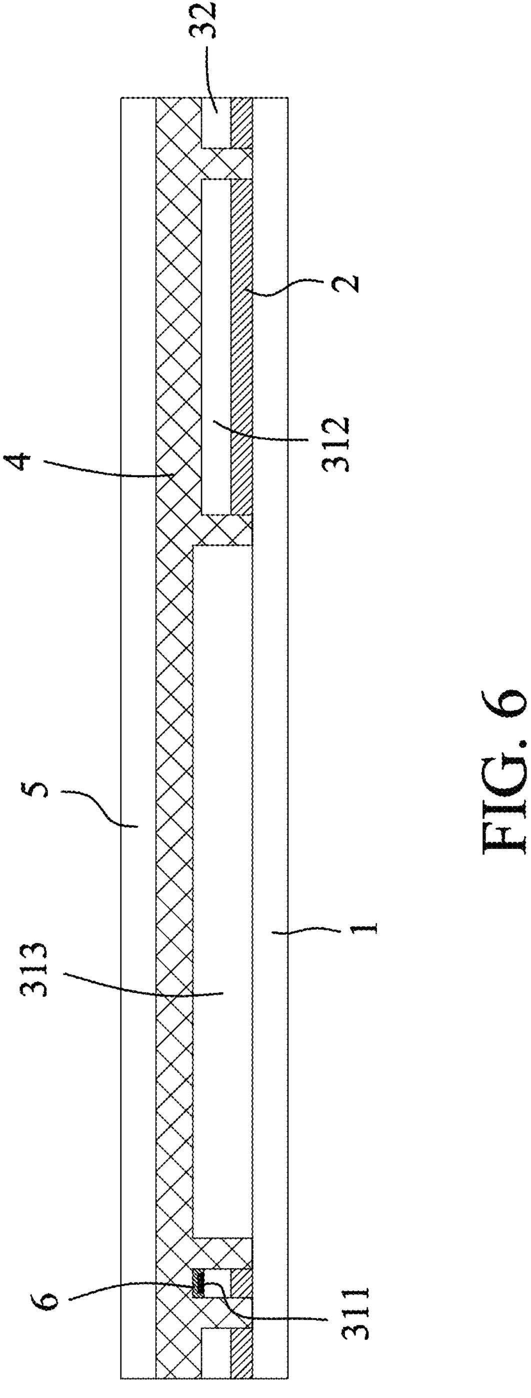
FIG. 6 is a cross-sectional view of the wireless information integrated flake according to an embodiment of the disclosure.

FIG. 3A is a plan view of an information region according to an embodiment of the disclosure, and FIG. 3B is a plan view of an information region according to another embodiment of the disclosure. FIG. 6 is a cross-sectional view of the wireless information integrated flake according to an embodiment of the disclosure. Wherein, FIG. 3A is corresponding to the above-mentioned embodiment of FIG. 2A which can be full of a spacing ITV between the electromagnetic induction heating ring 32 and the information region 31, and FIG. 3B is corresponding to the above-mentioned embodiment of FIG. 2B which the electromagnetic induction heating ring 32 and the information region 31 are separated almost entirely by a spacing ITV. As shown in FIG. 3A or 3B, the information region 31 comprises the chip 311 and the antenna 312. The positions of the chip 311 and the antenna 312 relative to each other in a cross-sectional view are shown in FIG. 6. As shown in FIG. 6, the chip 311 is covered with a chip package protective glue 6

(made of epoxy resin, for example), and thus the chip 311 as well as bonding wires for connecting the chip 311 and the antenna 312 are protected by the chip package protective glue 6 against damage otherwise caused by an external force. As long as the wireless information transmission function can be performed, the chip 311 and the antenna 312 can be arranged in the manner depicted by FIG. 3A or 3B and FIG. 6 or in another manner according to the RFID frequency band that the user wants to use, but the disclosure is not limited thereto.

In another embodiment illustrated by FIG. 6, the information region 31 further has a battery 313 for supplying the electric power required for information transmission. Preferably, the battery 313 is positioned to not hide the antenna such that the battery 313 does not affect the wireless transmission of the antenna 312. The thickness of the battery 313 is greater than or less than the antenna 312, depending on the materials which the battery is made of, application requirements, and allowable space between the container and the cap. Specifically speaking, when power supply is started according to a default command from an application software and a reader/writer, the chip 311 for use in wireless information transmission operates regularly and thus keeps a record of the operation parameters (for example, temperature parameter and position parameter) regularly to facilitate the effective control of logistics (for example, cold-chain logistics), for example, can be arranged according to the marked scope, size, thickness or manner shown in FIG. 6.

As shown in FIG. 3A or 3B, in another embodiment, a cutting line 321 is defined on an inner side of an inner rim of the electromagnetic induction heating ring 32. The cutting line 321 preferably has a plurality of break points. Specifically speaking, the cutting line 321 has at least four break points. Despite the great material rupture strength of the wireless information integrated flake, the cutting line 321 enables the wireless information integrated flake to be applicable to specific sealing liners, for example, a sealing liner whose sealing ring remains on the container mouth after a user gripping a pull portion of the sealing liner with his or her fingers has torn off a middle portion of the sealing liner. As shown in FIG. 3A or 3B, the cutting line 321 lies between the information region 31 (comprising the chip 311 and the antenna 312) and the electromagnetic induction heating ring 32 and surrounds the information region.

Finally, the thickness of the information-heating layer 3 can be adjusted according to the materials which the battery is made of, user needs (i.e., the intended sealing liner), and allowable space between the container and the cap. Specifically speaking, the information-heating layer is of a thickness of 6 μm~2.5 mm when applicable to a sealing liner that comprises the battery, whereas the information-heating layer is of a thickness of 6 μm~300 μm when applicable to a sealing liner that does not comprise the battery.

Although FIG. 1 shows that the base membrane 1 is above the information-heating layer 3, the sequence can be inverted, it is also feasible for the base membrane 1 to be below the information-heating layer 3 as needed.

Second Embodiment

Figure 4:
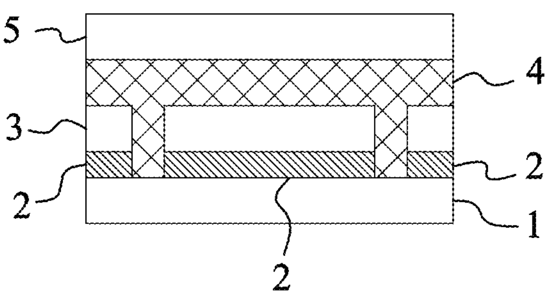
FIG. 4 is a cross-sectional view of the wireless information integrated flake according to an embodiment of the disclosure.

Unlike the wireless information integrated flake 100 in the first embodiment, the wireless information integrated flake 100' in the second embodiment shown in FIG. 4 further comprises a protective layer 5 and a second adhesion layer 4. The protective layer 5 is disposed on a side of the information-heating layer 3 and facing away from the base membrane 1. The second adhesion layer 4 is disposed between the information-heating layer 3 and the protective layer 5 and adapted to join the information-heating layer 3 and the protective layer 5 together.

<<Second Adhesion Layer>>

In a specific embodiment, the sole purpose of the second adhesion layer 4 is to join the information-heating layer 3 and the protective layer 5 together, whereas the second adhesion layer 4 is, for example, made of lamination adhesive, but the disclosure is not limited thereto. The second adhesion layer 4 is of a thickness of 0.5 μm~7 μm to preferably allow the peel strength between two joined material layers to be greater than 4N/15 mm. As shown in FIG. 4, the second adhesion layer 4 extends to fully fill the spacing between the electromagnetic induction heating ring 32 and the information region 31, increasing the overall structural strength of the wireless information integrated flake 100'.

<<Protective Layer>>

The protective layer 5 in this embodiment is described below. The protective layer 5 protects the information region 31 (i.e., the chip 311, the antenna 312, and optionally the battery 313) such that the chip 311 and the battery 313 will not be damaged under any external force to other affect its wireless information transmission capability. The protective layer 5 is made of at least one selected from the group consisting of Polyethylene Terephthalate (PET), Polypropylene (PP), Polyethylene (PE), Polyamide (PA), Polyvinylidene Chloride (PVDC), Ethylene Vinyl Alcohol copolymer (EVOH), Polyethylene Naphthalate (PEN) and Polyimide (PI). In a preferred embodiment, the protective layer 5 is of a thickness of 12 μm~100 μm.

Either the upper surface or the lower surface of the protective layer 5 serves as a printing surface. Therefore, although FIG. 4 shows that the base membrane 1 is below the protective layer 5 (wherein the upper surface of the protective layer 5 serves as a printing surface), the sequence can be inverted, it is also feasible for the base membrane 1 to be above the protective layer 5 (wherein the lower surface of the protective layer 5 serves as a printing surface) as needed.

Making Wireless Information Integrated Flake

The roll material of wireless information integrated flake related to the embodiment is made by following the steps described below.

First, lamination adhesive (first adhesion layer) is applied to the lamination surface of the roll material of base membrane and laminated to the lamination surface of the roll material of metal foil to make a roll material of wireless information integrated flake blank. Then, the metal foil of the roll material of wireless information integrated flake blank undergoes etching processing, and electrically connect the antenna and the chip through wire bonding. Next, the chip as well as the bonding wires connecting the chip and the antenna are packaged, using a dispenser and the chip package protective glue. At this point in time, the information-heating layer is formed on the metal foil, and the roll material of wireless information integrated flake blank becomes the roll material of wireless information integrated flake related to an embodiment. After that, the roll material of wireless information integrated flake blank can be cut according to the needs to make the required wireless information integrated flake.

The peel strength between two material layers laminated together by the lamination adhesive is greater than 4N/15 mm.

To add the battery to the information-heating layer, it is feasible for the battery plate and the chip to be processed by a welder or with electrically conductive glue and thus electrically connected.

In another aspect, the roll material of wireless information integrated flake related to another embodiment is made by following the steps described below.

First, lamination adhesive (first adhesion layer) is applied to the lamination surface of the roll material of base membrane and laminated to the lamination surface of the roll material of metal foil to make a roll material of wireless information integrated flake blank. Then, the metal foil of the roll material of wireless information integrated flake blank undergoes etching processing, and electrically connect the antenna and the chip through wire bonding. Next, the chip as well as the bonding wires connecting the chip and the antenna are packaged, using a dispenser and the chip package protective glue. At this point in time, the information-heating layer is formed on the metal foil, and the roll material of wireless information integrated flake blank becomes the roll material of wireless information integrated flake related to another embodiment.

After that, lamination adhesive (second adhesion layer) is applied to the roll material of protective layer and laminated to a surface of the information-heating layer of the roll material of wireless information integrated flake related to another embodiment (i.e., the surface facing away from the base membrane) to make the roll material of wireless information integrated flake related to another embodiment. After that, the roll material of wireless information integrated flake blank related to another embodiment can be cut according to the needs to make the required wireless information integrated flake.

The peel strength between two material layers laminated together by the lamination adhesive is greater than 4N/15 mm. To add the battery to the information-heating layer, it is feasible for the battery plate and the chip to be processed by a welder or with electrically conductive glue and thus electrically connected.

(Making the Sealing liner)

Figure 5:
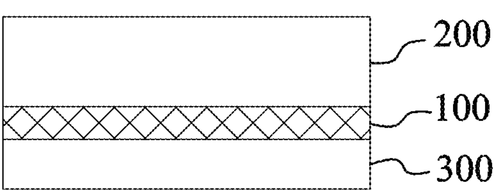
FIG. 5 is a cross-sectional view of a sealing liner according to an embodiment of the disclosure.

A sealing liner is made from the roll material of wireless information integrated flake of the disclosure. Referring to FIG. 5, there is shown a cross-sectional view of a sealing liner 900 according to an embodiment of the disclosure. As shown in FIG. 5, the roll material of wireless information integrated flake 100, an upper layer 200 and a lower layer 300 in the aforesaid embodiment are coupled together to make the roll material of sealing liner 900. After that, the roll material of sealing liner 900 can be composited and cut according to the needs to make the required sealing liner.

The upper layer 200 is made of at least one selected from the group consisting of paper, PE, PP, PET, PEN, PA, Polyimide (PI), Expandable Polyethylene (EPE), Expandable Polypropylene (EPP), Expandable Polystyrene (EPS), wax, varnish, silicone oil and Polyurethane, and being of a thickness of 12 μm~3 mm. The lower layer 300 (an adhesive sealing film or an adhesive sealing film and a reinforcing layer thereon) for use in sealing the mouth of a container is made of at least one selected from the group consisting of paper, PE, PP, PET, Polyamide (PA), Polyvinylidene Chloride (PVDC), Ethylene Vinyl Alcohol copolymer (EVOH), Ethylene Vinyl Acetate copolymer (EVA), Polyisobutylene (PIB), Ethylene Acrylic Acid copolymer (EAA), Ethylene Ethyl Acrylate (EEA), Ethylene-Methyl Methacrylate copolymer (EMMA), Ethylene-Methyl Acrylate copolymer (EMAC), Ethylene Methacrylic Acid copolymer (EMAA), polyacrylate, polyacetate and polyurethane, and being of a thickness of 3 μm~120 μm.

The lamination may be achieved by the aforesaid lamination technique or a conventional technique of adhesion, compression or coating, but the disclosure is not limited thereto.

It is noteworthy that the aforesaid description is merely descriptive of a specific embodiment not restrictive of the sequence of the steps of forming the layers. Although the process of making the wireless information integrated flake 100 is described above, not only can the wireless information integrated flake 100' substitute for the wireless information integrated flake 100, but adhesion, joining, laminating or connection can also substitute for lamination.

The invention is not restricted to the aforesaid embodiments. Various changes can be made to the invention without departing from the scope of the appended claims. Any embodiment obtained by appropriately combining the technical features disclosed in different embodiments shall be deemed falling within the scope of the invention.

While the present disclosure has been described by means of specific embodiments, numerous modifications and variations could be made thereto by those skilled in the art without departing from the scope and spirit of the present disclosure set forth in the claims.

What is claimed is:

1. A wireless information integrated flake, comprising:

a base membrane;

an information-heating layer comprising an information region and an electromagnetic induction heating ring; and a first adhesion layer disposed between the base membrane and the information-heating layer, wherein the information region has an antenna and a chip conductively connected to each other, and the electromagnetic induction heating ring surrounds the information region when viewed from a plan-view angle, wherein the electromagnetic induction heating ring separates from the information region by a spacing, and wherein the spacing is the distance between the outermost edge of the information region and the innermost edge of the electromagnetic induction heating ring and is equal to 0.1 mm ~3 mm.

2. The wireless information integrated flake of claim 1, further comprising a protective layer and a second adhesion layer, the protective layer being disposed on a side of the information-heating layer and facing away from the base membrane, and the second adhesion layer being disposed between the information-heating layer and the protective layer.

3. The wireless information integrated flake of claim 2, wherein the protective layer is made of at least one selected from the group consisting of Polyethylene Terephthalate (PET), Polypropylene (PP), Polyethylene (PE), Polyamide (PA), Polyvinylidene Chloride (PVDC), Ethylene Vinyl Alcohol copolymer (EVOH), Polyethylene Naphthalate (PEN) and Polyimide (PI), and being of a thickness of 12 μm~100 μm.

4. The wireless multifunction integrated flake of claim 2, wherein the second adhesion layer is made of lamination adhesive and is of a thickness of 0.5 μm~7 μm.

5. The wireless information integrated flake of claim 1, wherein there is full of a spacing between the electromagnetic induction heating ring and the information region.

6. The wireless information integrated flake of claim 1, wherein the base membrane is made of at least one selected from the group consisting of Polyimide (PI), Polyethylene Naphthalate (PEN), Polyethylene Terephthalate (PET), Polycarbonate (PC), Polypropylene (PP) and Polyethylene (PE), and being of a thickness of 20 μm~150 μm.

7. The wireless information integrated flake of claim 1, wherein a cutting line is defined on an inner side of an inner rim of the electromagnetic induction heating ring, has a plurality of break points, lies between the information region and the electromagnetic induction heating ring, and surrounds the information region.

8. The wireless information integrated flake of claim 1, wherein the electromagnetic induction heating ring is made of aluminum, copper, gold, silver or tin, and being of a thickness of 6 μm~40 μm.

9. The wireless information integrated flake of claim 1, wherein the first adhesion layer is made of lamination adhesive and is of a thickness of 0.5 μm~7 μm.

10. The wireless information integrated flake of claim 1, wherein the information-heating layer comprising at least one physical connection bridge which connecting the information region and the electromagnetic induction heating ring.

11. A sealing liner, comprising the wireless information integrated flake of claim 1.

12. The sealing liner of claim 11, further comprising an upper layer laminated to the wireless information integrated flake from above, the upper layer being made of at least one selected from the group consisting of paper, PE, PP, PET, PA, PEN, Polyimide (PI), Expandable Polyethylene (EPE), Expandable Polypropylene (EPP), Expandable Polystyrene (EPS), wax, varnish, silicone oil and Polyurethane, and being of a thickness of 12 μm~3 mm.

13. The sealing liner of claim 11, further comprising a lower layer laminated to the wireless information integrated flake from below, the lower layer being made of at least one selected from the group consisting of paper, PE, PP, PET, Polyamide (PA), Polyvinylidene Chloride (PVDC), Ethylene Vinyl Alcohol copolymer (EVOH), Ethylene Vinyl Acetate copolymer (EVA), Polyisobutylene (PIB), Ethylene Acrylic Acid copolymer (EAA), Ethylene Ethyl Acrylate (EEA), Ethylene-Methyl Methacrylate copolymer (EMMA), Ethylene-Methyl Acrylate copolymer (EMAC), Ethylene Methacrylic Acid copolymer (EMAA), polyacrylate, polyacetate and polyurethane, and being of a thickness of 3 μm~120 μm.

* * * * *